May 27, 1952 W. J. PINE 2,598,069
APPARATUS FOR SHARPENING LAWN MOWERS
Filed May 9, 1946 2 SHEETS—SHEET 1
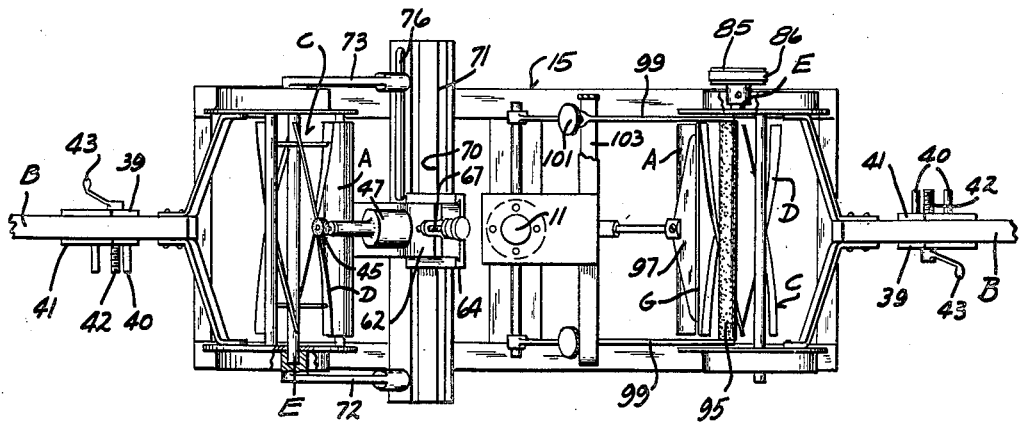
INVENTOR
WILBUR J. PINE
ATTORNEYS May 27, 1952            W. J. PINE            2,598,069
APPARATUS FOR SHARPENING LAWN MOWERS
Filed May 9, 1946            2 SHEETS—SHEET 2
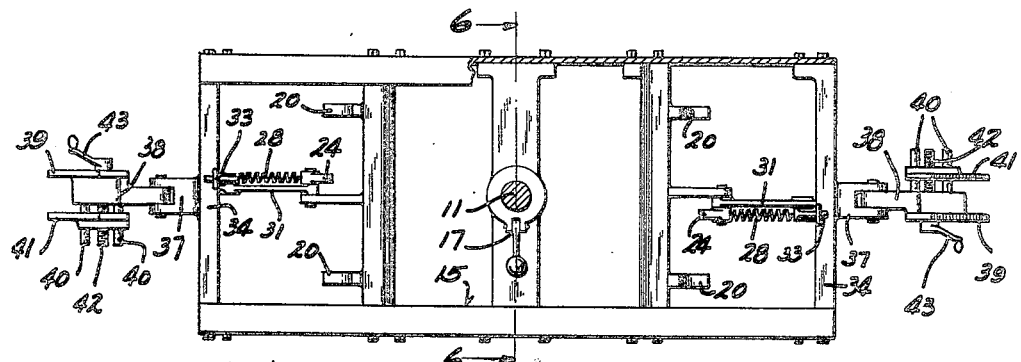
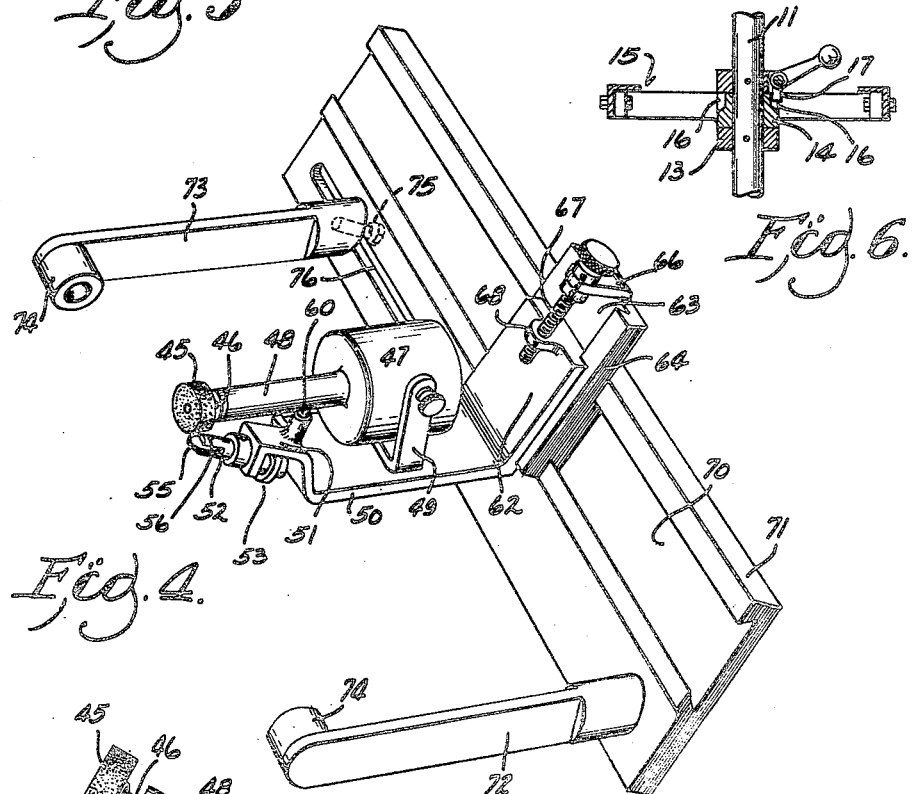
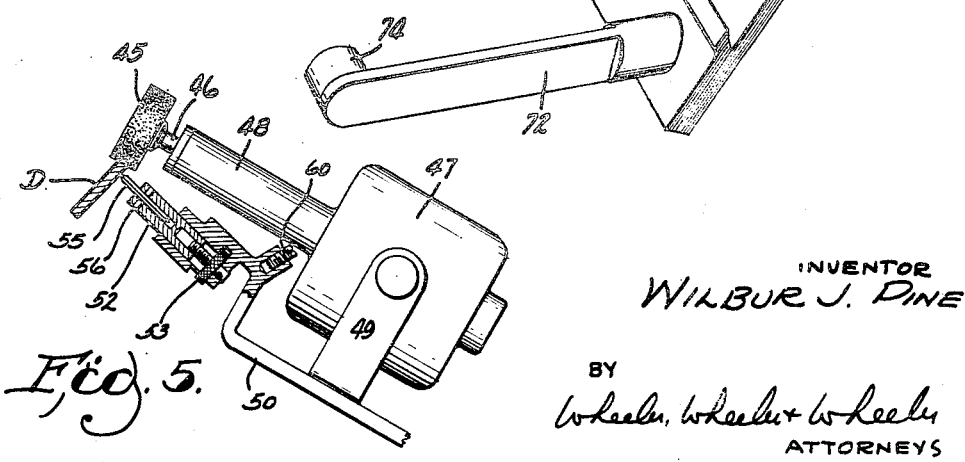
INVENTOR
WILBUR J. PINE
BY
Wheeler, Wheeler & Wheeler
ATTORNEYS Patented May 27, 1952

2,598,069

UNITED STATES PATENT OFFICE 2,598,069

APPARATUS FOR SHARPENING LAWN MOWERS

Wilbur J. Pine, Wausau, Wis.; W. Morton Pine, Milwaukee, Wis., administrator of said Wilbur J. Pine, deceased Application May 9, 1946, Serial No. 668,438

11 Claims. (Cl. 51—34)

My invention relates to improvements in apparatus for sharpening lawn mowers.

Objects of my invention are to provide power driven means for properly grinding lawn mower blades while attached to the reel of a lawn mower; to provide for uniformly grinding the beveled edges of the blades into conformity with the surface of an imaginary cylinder concentric to the axis of the reel; to provide for supporting one or more lawn mowers in inverted positions, each with its reel free to oscillate or rotate during the grinding and other reconditioning operations; to provide means whereby blades of a plurality of lawn mowers may be simultaneously sharpened and lapped by a single operator; and, in general, to provide means whereby the sharpening of lawn mowers may be carried on in a manner favoring inspection, manual adjustment, and axial advancement or reciprocation of a grinding wheel during such operations, whereby the sharpening of lawn mowers may be standardized and accurate results uniformly obtained.

In the drawings:

Figure 1 is a front elevation of a lawn mower sharpening apparatus, with two lawn mowers mounted thereon in different stages of a sharpening operation.

Figure 2 is a plan view of the same.

Figure 3 is a plan view of the carrier, stripped of the lawn mowers and grinding wheel assembly, and showing the supporting post in cross section.

Figure 4 is an enlarged perspective view of the grinding wheel assembly.

Figure 5 is a detail view, in front elevation, showing a portion of the motor supporting base, grinding wheel motor, and grinding wheel in grinding relation to a lawn mower blade, which, with an auxiliary guiding steady rest, is shown in section.

Figure 6 is a detail view of the locking dog for locking the carrier in its two positions of indexing adjustment.

Like parts are identified by the same reference characters throughout the several views.

In the illustrated embodiment of my invention, a portable tripod 10 is provided with an upwardly extending post 11, having thereon a flange or collar 13 on which rests the central sleeve 14 of an indexing carrier 15. The sleeve 14 encircles the post above the collar 13 and is provided with notches 16 in which a dog 17, pivotally connected with the post, is adapted to be engaged, whereby to lock the carrier in either one of its two positions of indexing adjustment.

On each side of its central sleeve 14 the carrier is provided with a fixed clamping jaw 20, having a raised concave rest 21 adapted to receive the grass roller A of an inverted lawn mower. A movable clamping jaw 24 is employed to clamp the grass roller to the rest 21. This movable clamping jaw preferably comprises one arm of a bell crank which is pivoted to a carrier pivot stud 26 and has a depending actuating arm 27 connected by a tension spring 28 with the depending arm of a latch lever 29, pivoted at 30 to an operating lever 31, one end of which is fulcrumed on the pivot stud 26. The upper end of the latch lever 29 has a hook-shaped beveled head 33 adapted to be forced by the operating lever 31 into position for engagement with a catch 34 on the carrier when the movable clamping jaw 24 is swung into clamping engagement with the grass roller. The degree of clamping pressure is determined by the tension of spring 28, and under the yielding pressure exerted by this spring, grass rollers of differing diameters may be clamped to the rest 21 with substantially equal clamping pressure. To release the grass roller, the operating lever 31 will be slightly raised and the latch head 33 manually retracted from the catch 34, whereupon downward movement of the operating lever relieves the tension of the spring 28 and allows the movable clamping jaw 24 to freely retract.

Each end of the carrier is provided with a suitable vise in which the handle B of an inverted lawn mower may be clamped at the same time that its grass roller A is clamped to the concave rest 21. An arm 37 depends obliquely from the end of the carrier and is provided with a pivoted rest 38 having a fixed clamping plate or vise jaw 39. Guide pins 40 on the other side of the rest 38 loosely support a clamping jaw 41 with which an operating screw 42 has threaded engagement, this screw being provided with a manually operable crank 43, whereby the jaw 41 may be drawn into pressure engagement with the lawn mower handle B.

When a lawn mover is to be sharpened, it is inverted and its grass roller and handle clamped to the carrier as above described. The traction wheels and reel driving pinions are then removed, leaving the blade carrying reel C of the lawn mower in an elevated position, with its blades D exposed. By rotation or oscillation of the reel, the blades D may be successively brought into contact with a grinding wheel as hereinafter described. The grinding wheel assembly is best illustrated in Figure 4. The grinding wheel 45 is mounted on a shaft 46 of a motor indicated at 47, having a bearing sleeve 48 through which the grinding wheel shaft extends. The motor is pivotally supported by a bracket 49 from a base 50, the end of which nearest to the grinding wheel has an elbowed extension 51. A forked rod 52 is adjustably connected with the extension 51, a micrometer screw 53 being employed to adjust the rod 52 forth and back. A guiding steady rest roller 55 is supported by a shaft 56 between the fork arms of the rod 52 in a position to bear against one side of a reel blade D, the blade being urged against this roller 55 by the pressure of the grinding wheel 45 during a grinding operation, as best shown in Figure 5. Another adjusting screw 60, threaded into the motor supporting base 50, determines the grinding bevel.

The motor supporting base 50 has an obliquely elbowed portion 62 slidingly mounted in a guideway 63 in a slide 64. This slide is provided with an arm 66 connected by an adjusting screw 67 with a bracket 68 on the elbowed portion 62 of the base, whereby the base may be raised or lowered to radially adjust the grinding wheel in correspondence with the diameter of the lawn mower reel.

The slide 64 is movable transversely of the carrier in a slideway 70 formed in a mounting plate 71 which is suspended from the reel shaft E by hanger arms 72 and 73, provided with bearings for socketed heads 74 in which the ends of the reel shaft E may be engaged. The hanger arm 72 may be fixed to the mounting plate 71, but the hanger arm 73 is connected with the mounting plate by a bolt 75 which passes through a slot 76, whereby this hanger may be adjusted at different distances from the hanger 72 in order that these hangers may engage reel shafts of different lengths.

The mounting plate 71 has a bracket 78 in which an adjusting screw 81 has threaded engagement. The lower end of this screw bears upon a portion 79 of the carrier and the screw may be adjusted to vary the pitch of the mounting plate and its distance from the carrier so that the motor supporting base will clear the shear bar G. The motor supporting base 50 may be raised or lowered with reference to its supporting slide 64 by adjusting the screw 67 in correspondence with the diameter of the particular lawn mower reel from which the mounting plate is suspended. The adjustment of the screw 60 determines the grinding bevel, and the helically curved blade D to be ground will be accurately positioned by the steady rest roller 55 which travels along the side of the blade in correspondence with the reciprocating movement of the grinding wheel, its motor, and the supporting slide.

It will thus be apparent that lawn mowers of different sizes may be clamped to the carrier 15, and the grinding wheel assembly may then be suspended from the reel shaft of the lawn mower and the above described adjustments made in correspondence with the size of the reel. In all instances, the cutting edges of the blades on each reel will be ground to a predetermined bevel at a precise radial distance from the axis of the reel. Owing to the fact that the grinding wheel is accurately positioned, a single traverse of the slide 64 from one end of the slideway to the other may be sufficient, although, if desired, the slide and motor may be reciprocated during the grinding operation. Regardless of the rapidity of the reciprocation or the number of reciprocations, each blade will be accurately ground until its cutting edge conforms precisely to the surface of an imaginary cylinder concentric to the axis of the reel at the predetermined radius.

After all of the blades on the reel have been ground, the hangers 72 and 73 are disconnected from the ends of the reel shaft and the grinding wheel assembly removed from the carrier. Thereupon the locking dog 17 is released and the carrier rotated a one-half turn and again locked by engagement of the dog 17 in the diametrically opposite notch 16 in the sleeve 14. A pulley 85 may then be mounted on one end of the reel shaft and connected by a belt 86 with a driving pulley 87 on the shaft of a motor, indicated at 88 as being mounted on a lever 89 pivotally connected with the tripod at 90. When not in use, this lever may be held in a raised position by a latch 91 which engages a catch 92 on the head of the tripod. After adjusting the belt 86 to its pulleys, latch 91 is released to allow the lever to swing downwardly, whereupon the weight of the motor determines the tension of the belt.

The motor may then be started to rotate the reel and bring the beveled edges of its blades D successively into contact with a cushioned surface of a roller 95 impregnated with oil and emery for lapping purposes. An adjustable steady rest 97 supports the shear bar G of the lawn mower against vibration as the blades successively contact therewith during rotation of the reel. The roller 95 is supported in a proper position for contact with the beveled edges of the blades by an arm 99 pivoted to a bracket 100 on the post 11, and an adjusting screw 101 bears on another bracket 103 to properly position the arm 99 during the lapping operation.

In the meantime another lawn mower may have been clamped to the other end of the carrier, and its blades may be ground simultaneously with the lapping operation on the blades of the lawn mower which was first ground.

In this manner a series of lawn mowers of uniform size may be successively ground and lapped in quick succession, few readjustments being required, except when a series of lawn mowers of different size are to be ground. The grinding and lapping operations will be exactly alike for all lawn mowers of each series.

It will be understood that all of the blades will thus be ground to a radius of the shear bar from the axis of the reel. All shear bars are adjustable, and if damaged, they are either ground to a straight line and adjusted into parallelism with the axis of the reel, or replaced. Therefore a perfect shearing action can be ensured.

I claim:

1. Apparatus for sharpening lawn mower blades without separating them from a lawn mower, comprising the combination with a support provided with means for clamping a lawn mower thereto in an inverted position, of a set of hangers comprising arms provided with bearing means connectible with the blade carrying reel shaft, a slide supported by said hangers for movement along a line parallel with the axis of the reel, a grinding wheel carried by said slide with its abrading surface at a distance from the axis of the reel corresponding with that of the shear bar, and means connected with said slide and projecting into engagement with a blade of the reel for oscillating the reel to maintain one of its blades continuously in contact with the grinding wheel at said distance from the axis while the grinding wheel is traveling from one end of the blade to the other.

2. In apparatus for sharpening lawn mower blades without separating them from a lawn mower, the combination with a support provided with means for clamping a lawn mower thereto in an inverted position with the reel and its shaft exposed, of a set of hangers having socketed heads connectible with the ends of the reel shaft, and grinding mechanism supported by said hangers in position for determining a grinding radius in correspondence with the distance of the shearing edge of the shear bar from the axis of the reel.

3. In apparatus for sharpening lawn mower blades without detaching them from their supporting frames, a grinding wheel, and a mounting assembly upon which said wheel is rotatably supported, said assembly including the combination of a set of hangers having bearings engageable with the ends of a lawn mower reel shaft, the said assembly and wheel being bodily rotatable with said hangers about the axis of said shaft, whereby to be adapted for swinging adjustment, together with means for adjusting said assembly about said axis to predetermine the bevel and the grinding radius with reference to the reel shaft and the shear bar.

4. Apparatus for sharpening the blades of a lawn mower while attached to its reel, comprising the combination of means for supporting the reel for oscillation about its own axis, a set of hangers engageable with the ends of the reel shaft, means connecting said hangers and supported thereby from said shaft and comprising a guideway parallel to said axis, a slide reciprocable along the way and supported by said hangers for movement along a line parallel with the axis of said shaft, grinding mechanism carried by said slide and including a motor driven grinding wheel supported for grinding operations at a predetermined radius from said axis, and an adjustable steady rest adapted to limit rotation of the reel in one direction under pressure of the grinding wheel exerted in that direction on the blade which is being ground.

5. Apparatus as set forth in claim 4, in which the said grinding wheel is mounted for rotation on an axis transverse respecting the reel shaft axis.

6. In apparatus of the described class, the combination of a lawn mower support provided with means for clamping lawn mowers thereto in an inverted position, hangers having bearings adapted to engage the ends of the lawn mower reel shafts, a mounting plate connected with the hangers for oscillation therewith about the reel shaft axis and having an adjusting screw engageable with said support and adjustable transversely of said axis for adjusting the plate angularly thereabout, said mounting plate having a slideway parallel with the axis of the reel, a slide movable in said slideway from one end of the reel to the other, and blade grinding means carried by the slide, said grinding means being provided with a pivotal mounting upon the slide whereby it is adjustable respecting the slide in addition to its adjustment with the slide to predetermine the grinding radius and the grinding bevel, together with a bearing member carried by the slide in position for contact with a blade which is being ground in opposition to the grinding pressure adjacent to the point of grinding contact.

7. The combination with a lawn mower support having means for clampingly engaging the handle and grass roller of the lawn mower to fixedly hold the same in an inverted position, with its blade carrying reel exposed and free for rotation, of a grinding wheel assembly provided with hangers for suspending it from the respective ends of the lawn mower reel shaft, and including a power driven grinding wheel reciprocable along a line parallel with the reel shaft at a predetermined radius from the reel axis.

8. In apparatus of the described class, the combination with a lawn mower support, of a sub-frame comprising a set of hangers having bearings engageable with the ends of the lawn mower reel shaft, of a grinding wheel assembly connected with said hangers and including a pivotally supported motor having a motor driven shaft provided with a grinding wheel, the pivotal axis of the motor being parallel with that of the reel axis and the said motor shaft being adjustable in a plane transverse to such axis, a set screw adjustable between the sub-frame and the support for limiting the swinging movement of said motor shaft and grinding wheel to a predetermined radius from said axis, said sub-frame comprising a way, and the motor and grinding wheel being mounted upon a slide reciprocable upon the way along a line parallel to the axis of the reel, and means connected with the slide and engageable with a blade of such reel for rotating the reel in correspondence with the curvature of the blade which is being ground to maintain said blade in registry with the grinding wheel while the latter is traveling along its cutting margin.

9. In a device for sharpening the blades of a reel type lawnmower without removal of the reel from the mower frame, a grinder for mounting on the ends of the reel shaft and comprising hanger arms for mounting on the reel shaft ends, a slide supported by the hanger arms, a grinding wheel carried by the slide with its abrading surface at a distance from the reel axis equal to the distance of the shear bar edge from such axis, and a rotatable bearing member carried by the slide for contact with a reel blade and for maintaining the blade edge in contact with the grinding wheel during slide movement.

10. In a device for sharpening the blades of a reel type lawnmower without removal of the reel from the mower frame, a grinder for mounting on the ends of the reel shaft and comprising hanger arms for mounting on the reel shaft ends, a slide supported by the hanger arms, a second slide mounted on the first slide and adjustable at right angles thereto, a grinding wheel carried by the second slide to position the wheel abrading surface at a distance from the reel axis equal to the desired distance of the shear bar edge from such axis, and means carried by the slide for contact with a reel blade and for maintaining the blade edge in contact with the grinding wheel during slide movement.

11. In a device for sharpening the blades of a reel type lawnmower without removal of the reel from the mower frame, a grinder for mounting on the ends of the reel shaft and comprising hanger arms for mounting on the reel shaft ends, a slide supported by the hanger arms, a grinding wheel carried by the slide with its abrading surface at a distance from the reel axis equal to the distance of the shear bar edge from such axis, and means carried by the slide and acting only between the slide and the grinding wheel for adjusting the grinding wheel for grinding the reel blade at a predetermined bevel along the entire cutting edge thereof.

WILBUR J. PINE.

REFERENCES CITED

The following references are of record in the file of this patent:

UNITED STATES PATENTS

| Number | Name | Date |
|---|---|---|
| 416,109 | Hyde et al. | Nov. 26, 1889 |
| 847,463 | Busselle et al. | Mar. 19, 1907 |
| 850,374 | King | Apr. 16, 1907 |
| 1,448,519 | Brown | Mar. 13, 1923 |
| 1,513,276 | Royer | Oct. 28, 1924 |
| 1,807,934 | Ross | June 2, 1931 |
| 1,871,674 | Ellithorpe | Aug. 16, 1932 |
| 1,888,572 | Root | Nov. 22, 1932 |
| 1,958,947 | Holliday | May 15, 1934 |
| 2,073,861 | Wolf | Mar. 16, 1937 |
| 2,110,637 | Simmons et al. | Mar. 8, 1938 |
| 2,204,293 | Beaver | June 11, 1940 |
| 2,245,968 | Erdman | June 17, 1941 |
| 2,343,072 | Miller | Feb. 29, 1944 |